(12) United States Patent
Tian et al.

(10) Patent No.: US 8,017,291 B2
(45) Date of Patent: Sep. 13, 2011

(54) IMAGE-FORMING MATERIAL (75) Inventors: Minquan Tian, Kanagawa (JP); Kazuhiko Hirokawa, Kanagawa (JP); Yuka Ito, Kanagawa (JP); Suguru Nakaso, Kanagawa (JP); Shinji Hasegawa, Kanagawa (JP); Miho Watanabe, Kanagawa (JP); Takashi Matsubara, Kanagawa (JP); Kazunori Anazawa, Kanagawa (JP); Tomoco Miyahara, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 362 days.

(21) Appl. No.: 12/359,798

(22) Filed: Jan. 26, 2009

(65) Prior Publication Data

US 2010/0071592 A1 Mar. 25, 2010

(30) Foreign Application Priority Data

Sep. 25, 2008 (JP) ................... 2008-246708

(51) Int. Cl.
*G03G 9/00* (2006.01)
*C07D 487/00* (2006.01)

(52) U.S. Cl. ................. 430/108.1; 544/231; 544/249

(58) Field of Classification Search ............ 430/108.1; 544/231, 249

See application file for complete search history.

(56) References Cited

U.S. PATENT DOCUMENTS

| | | | |
|---|---|---|---|
| 5,380,635 A | 1/1995 | Gomez et al. | |
| 5,935,755 A | 8/1999 | Kazmaier et al. | |
| 6,329,128 B1 * | 12/2001 | Helland et al. | 430/510 |
| 6,391,535 B1 * | 5/2002 | Arimoto et al. | 430/619 |
| 6,541,100 B1 | 4/2003 | Williams et al. | |
| 6,605,416 B2 * | 8/2003 | Busman et al. | 430/325 |
| 7,910,733 B2 * | 3/2011 | Tian et al. | 544/249 |

FOREIGN PATENT DOCUMENTS

| | | |
|---|---|---|
| JP | A-9-90547 | 4/1997 |
| JP | A-9-119867 | 5/1997 |
| JP | A-9-509503 | 9/1997 |
| JP | A-2000-207512 | 7/2000 |
| JP | A-2001-294785 | 10/2001 |
| JP | A-2002-278023 | 9/2002 |
| WO | WO 95/23357 | 8/1995 |

* cited by examiner

*Primary Examiner* — Hoa Le
(74) *Attorney, Agent, or Firm* — Oliff & Berridge, PLC (57) ABSTRACT

An image-forming material includes a perimidine-based squarylium dye represented by the following Formula (I):

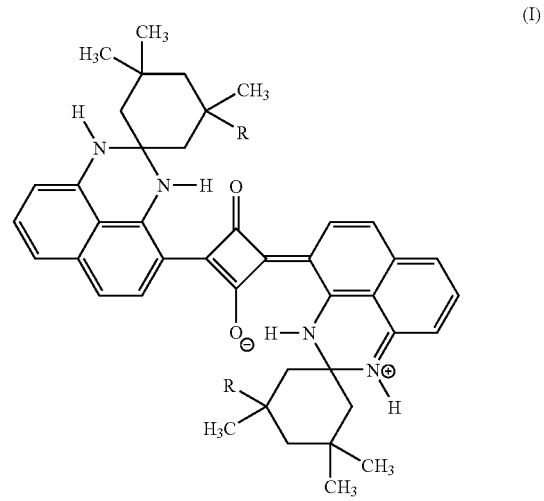

wherein, in Formula (I), R represents a hydrogen atom or a methyl group.

9 Claims, 7 Drawing Sheets

IMAGE-FORMING MATERIAL

CROSS-REFERENCE TO RELATED APPLICATION

This application is based on and claims priority under 35 USC 119 from Japanese patent Application No. 2008-246708 filed on Sep. 25, 2008.

BACKGROUND

1. Technical Field

The present invention relates to an image-forming material.

2. Related Art

In recent years, a technology has attracted attention in which invisible information, which is not visible under normal visual conditions, is recorded on a document. The technology is useful in the security management and in embedding of Internet information or voice, and is able to enhance the added value of the document.

The invisible information may be recorded by a method in which an image-forming material having absorption in a near-infrared region of from 750 nm to 1000 nm—a wavelength region able to be detected by, for example, a silicon light-receiving device (such as CCD) but unable to be detected by human eyes—is used.

SUMMARY

According to an aspect of the present invention, there is provided an image-forming material, including a perimidine-based squarylium dye represented by the following Formula (I):

(I)

wherein, in Formula (I), R represents a hydrogen atom or a methyl group.

BRIEF DESCRIPTION OF THE DRAWINGS

Exemplary embodiments of the present invention will be described in detail based on the following figures, wherein.

DETAILED DESCRIPTION

In what follows, exemplary embodiments of the present invention are described in detail.

An image-forming material of the exemplary embodiment contains a perimidine-based squarylium dye represented by the following Formula (I).

(I)

In Formula (I), R represents a hydrogen atom or a methyl group.

The perimidine-based squarylium dyes represented by Formula (I) include the compounds represented by Formula (I-a) and the compound represented by (I-b). Furthermore, in Formula (I-a), the orientations of a hydrogen atom (H) and a methyl group ($CH_3$) that are bonded to the same carbon atom in each cyclohexane ring are not particularly restricted, and the scope of the perimidine-based squarylium dyes represented by Formula (I-a) includes all stereoisomers thereof.

(I-a)

-continued

The perimidine-based squarylium dyes represented by Formula (I-a) are preferable in that they may be produced at low cost by synthesis according to reaction schemes (A-1) and (A-2) described below. The perimidine-based squarylium dye represented by Formula (I-b) has higher light resistance and is preferable from the viewpoint of long term storability of the image-forming material.

A perimidine-based squarylium dye represented by Formula (I) may be obtained according to, for example, a reaction scheme shown below.

More specifically, when 1, 8-diaminonaphthalene and a cyclohexanone derivative (a) (R representing a hydrogen atom or a methyl group.) in a solvent are allowed to react in the presence of a catalyst under conditions of azeotropic reflux, a perimidine intermediate (b) (R representing a hydrogen atom or a methyl group.) is obtained (step (A-1)). When a perimidine-based squarylium dye represented by Formula (I-a) is synthesized, 3,3,5-trimethylcyclohexanone may be used to prepare the perimidine intermediate (b). When the perimidine-based squarylium dye represented by Formula (I-b) is synthesized, 3,3,5,5-tetramethylcyclohexanone may be used to prepare the perimidine intermediate (b). Examples of the catalyst used in the step (A-1) include p-toluenesulfonic acid monohydrate, benzenesulfonic acid monohydrate, 4-chlorobenzenesulfonic acid hydrate, pyridine-3-sulfonic acid, ethanesulfonic acid, sulfuric acid, nitric acid and acetic acid. Furthermore, examples of the solvent used in the step (A-1) include alcohols and aromatic hydrocarbons. The perimidine intermediate (b) may be purified through high-performance column chromatography or recrystallization.

In the next place, the perimidine intermediate (b) and 3,4-dihydroxycyclobut-3-ene-1,2-dione (also called as "squaric acid" or "quadratic acid") are allowed to react in a solvent under azeotropic reflux conditions, whereby a perimidine-based squarylium dye represented by Formula (1) can be obtained (step (A-2)). The step (A-2) may be carried out under a nitrogen gas atmosphere.

Examples of the solvent used in the step (A-2) include: alcohols such as 1-propanol, 1-butanol and 1-pentanol; aromatic hydrocarbons such as benzene, toluene, xylene and monochlorobenzene; ethers such as tetrahydrofuran and dioxane; halogenated hydrocarbons such as chloroform, dichloroethane, trichloroethane and dichloropropane; and amides such as N,N-dimethylformamide and N,N-dimethylacetamide. Although an alcohol may be used singly, a solvent such as an aromatic hydrocarbon, an ether, a halogenated hydrocarbon or an amide is preferably mixed with an alcoholic solvent and used as a mixed solvent. Specific examples of solvents include 1-propanol, 2-propanol, 1-butanol, 2-butanol, a mixed solvent of 1-propanol and benzene, a mixed solvent of 1-propanol and toluene, a mixed solvent of 1-propanol and N,N-dimethylformamide, a mixed solvent of 2-propanol and benzene, a mixed solvent of 2-propanol and toluene, a mixed solvent of 2-propanol and N,N-dimethylformamide, a mixed solvent of 1-butanol and benzene, a mixed solvent of 1-butanol and toluene, a mixed solvent of 1-butanol and N,N-dimethylformamide, a mixed solvent of 2-butanol and benzene, a mixed solvent of 2-butanol and toluene and a mixed solvent of 2-butanol and N,N-dimethylformamide. When a mixed solvent is used, the concentration of alcoholic solvent is preferably 1% by volume or more, and more preferably from 5% by volume to 75% by volume.

Furthermore, in the step (A-2), a molar ratio of the perimidine derivative (b) to 3,4-dihydroxycyclobut-3-ene-1,2-dione (the number of the moles of the perimidine derivative (b)/the number of the moles of 3,4-dihydroxycyclobut-3-ene-1,2-dione) is preferably in a range of from 1 to 4, and more preferably in a range of from 1.5 to 3. When the molar ratio is lower than 1, the yield of the perimidine-based squarylium dye represented by Formula (I) tends to decrease. On the other hand, when the molar ratio is higher than 4, the usage efficiency of the perimidine derivative (b) may lower and separation and purification of the perimidine-based squarylium dye represented by Formula (I) tends to be difficult.

When a dehydrating agent is used in the step (A-2), the reaction time may shorten and the yield of the perimidine-based squarylium dye represented by Formula (I) tends to increase. The kind of the dehydrating agent is not particularly limited as long as it reacts with neither of the perimidine derivative (b) nor 3,4-dihydroxycyclobut-3-ene-1,2-dione. Examples of the dehydrating agent include orthoformic esters such as trimethyl orthoformate, triethyl orthoformate, tripropyl orthoformate and tributyl orthoformate; and molecular sieves.

The reaction temperature in the step (A-2) varies depending on the kind of the solvent to be used. However, the temperature of the reaction liquid is preferably 60° C. or above, and more preferably 75° C. or above. When a mixed solvent of 1-butanol and toluene is used for example, the temperature of the reaction liquid may be set to be within a range of from 75° C. to 105° C.

Furthermore, the reaction temperature in the step (A-2) varies depending on the kind of solvent or the temperature of the reaction liquid. For example, when a mixed solvent of 1-butanol and toluene is used and the temperature of the reaction liquid is set within a range of from 90° C. to 105° C., the reaction time may be from 2 hr to 4 hr.

The perimidine-based squaryliur dye represented by Formula (I) and generated in the step (A-2) can be purified through solvent wash, high-performance column chromatography or recrystallization.

In general, an image-forming material for recording invisible information may have sufficiently high absorbance in a near-infrared wavelength region of from 750 nm to 1000 nm from the viewpoint of readability (that is, infrared absorbing property) of the invisible information. On the other hand, the absorbance of the image-forming material in a visible wavelength region of from 400 nm to 750 nm may be sufficiently low from the viewpoint of securing invisibility of the information. Since the perimidine-based squarylium dye represented by Formula (I) has the above-mentioned optical characteristics, such a dye is useful as an image-forming material for recording invisible information.

In the image-forming material of the exemplary embodiment, the perimidine-based squarylium dye represented by Formula (I) may be contained in the form of particles Since the compound represented by Formula (I) shows significant intermolecular interaction and particles thereof have high crystallinity, the infrared color developing ability and light resistance may be more improved by including the particles in an image-forming material.

Particles of the perimidine-based squarylium dye represented by Formula (I) can be obtained for example by dissolving a purified product obtained by the step (A-2) in tetrahydrofuran, injecting, with a syringe, the solution into ice-chilled distilled water under agitation to cause precipitation, collecting the precipitates by suction filtration, washing the collected substance with distilled water, and vacuum-drying the substance. In the preparation of the particles, the particle diameter of the resulting precipitate can be controlled within a desired range by controlling the concentration of the perimidine-based squarylium dye represented by Formula (I) in the solution, the injection speed of the solution, the amount and/or temperature of the distilled water and the agitation speed. Furthermore, particles of the perimidine-based squarylium dye represented by Formula (I) can be prepared by a conventional processing method such as a method using a bead mill, a tumbling ball mill, a planetary ball mill, a high-speed rotation mill, or a jet mill or a dispersing method using an Ultimizer. The median diameter d50 of the particles of the perimidine-based squarylium dye represented by Formula (I) is preferably from 10 nm to 300 nm (or from about 10 nm to about 300 nm), and more preferably from 20 nm to 200 nm. When the median diameter d50 is less than 10 nm, the state of the dye molecules in each particle may be close to a monomolecular dispersion state, the intermolecular interaction may be smaller and the light resistance of the dye particles tends to be deteriorated. On the other hand, when the median diameter d50 exceeds 300 nm, light scattered by the surfaces of the particles may increase, and the infrared absorbing property tends to be deteriorated.

Crystalline particles of the perimidine-based squarylium dye represented by Formula (I) may exhibit predetermined diffraction peaks in a powder X-ray diffraction spectrum measured by irradiating X-rays having a wavelength of 1.5405 Å using a Cu target. Specifically, in the case of the perimidine-based squarylium dye represented by Formula (I-a), crystalline particles having diffraction peaks at least at 8.3°, 14.1°, 17.4°, 19.2°, 20.0°, 22.6° and 23.7° in terms of Bragg angle ($2\theta \pm 0.2°$) are preferred. In the case of the perimidine-based squarylium dye represented by Formula (I-b), crystalline particles having diffraction peaks at least at 7.7°, 11.2°, 15.4°, 16.6°, 18.2°, 19.8° and 25.8° in terms of Bragg angle ($2\theta \pm 0.2°$) are preferred. When the crystalline particles having such diffraction peaks are used, invisibility, infrared absorbing property and light resistance may be further improved.

The image-forming material of the exemplary embodiment may further contain a component other than the perimidine-based squarylium dye represented by Formula (I), as described below. The content of the perimidine-based squarylium dye is preferably from 0.05% by weight to 3% by weight (or about 0.05% by weight to about 3% by weight), and more preferably from 0.1% by weight to 2% by weight, based on the total weight of the image-forming material.

Applications of the image-forming material of the exemplary embodiment are not particularly limited, and examples thereof include application to electrophotographic toners and inks for inkjet printers, typographical printing, offset printing, flexographic printing, gravure printing or silk printing.

When the image-forming material of the exemplary embodiment is an elecrophotographic toner, the image-forming material of the exemplary embodiment may be used singly as a single component developer or may be combined with a carrier and used as a two-component developer. The carrier may be a known carrier, examples of which include a resin-coating carrier having a resin-covering layer on a core material. In the resin-covering layer, conductive powder or the like may be dispersed.

Furthermore, when the image-forming material of the exemplary embodiment is an electrophotographic toner, the image-forming material may contain a binder resin. Examples of the binder resin used include homopolymers or copolymers of each of the following: styrenes such as styrene and chlorostyrene; monoolefins such as ethylene, propylene, butylene and isoprene; vinyl esters such as vinyl acetate, vinyl propionate, vinyl benzoate and vinyl butyrate; α-methylene aliphatic monocarboxylate esters such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers such as vinyl methyl ether, vinyl ethyl ether and vinyl butyl ether; and vinyl ketones such as vinyl methyl ketone, vinyl hexyl ketone and vinyl isopropenyl ketone. Typical examples of the binder resin include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene and polypropylene. In addition, polyester, polyurethane, epoxy resin, silicone resin, polyamide, modified rosin and paraffin wax may also be used as binder resins.

When the image-forming material of the exemplary embodiment is an electrophotographic toner, the image-forming material may further contain a charge control agent and an offset preventing agent, as necessary. Charge control agents can be classified into two types: one for positive charge and the other one for negative charge. The charge control agent for positive charge may be, for example, a quaternary ammonium compound. The charge control agent for negative charge may be, for example, a metal complex of alkyl salicylic acid or a resin charge control agent containing a polar group. The offset inhibitor may be, for example, a low-molecular-weight polyethylene or a low-molecular-weight polypropylene.

Furthermore, when the image-forming material of the exemplary embodiment is an electrophotographic toner, inorganic particles and/or organic particles may be added to the surface of toner as an external additive, in order to improve the fluidity, powder storability, transferability and cleanability and to control frictional electrification. Examples of the inorganic particles include heretofore known ones such as particles of silica, alumina, titania, calcium carbonate, magnesium carbonate, calcium phosphate or cerium oxide. The inorganic particles may be subjected to a known surface treatment as required. Examples of the organic particles include particles of an emulsion polymer containing vinylidene fluoride, methyl methacrylate or styrene-methyl methacrylate as a component and particles of a soap-free polymer.

When the image-forming material of the exemplary embodiment is an ink for inkjet printers, such an image-forming material may be a water-containing aqueous ink. Furthermore, the image-forming material of the exemplary embodiment may further contain a water-soluble organic solvent so as to prevent drying of the ink and to improve the permeability of the ink. The water to be used may be ion exchange water, ultrafiltered water or pure water Examples of the organic solvent include polyhydric alcohols such as ethyleneglycol, diethyleneglycol, polyethyleneglycol and glycerin; N-alkyl pyrrolidones; esters such as ethyl acetate and amyl acetate; lower alcohols such as methanol, ethanol, propanol and butanol; and glycol ethers such as ethylene oxide or propylene oxide adducts of methanol, butanol or phenol. These organic solvents may be used singly or in combination of two or more thereof. The organic solvent may be appropriately selected in consideration of its hygroscopicity, its moisture retaining properties, the solubility of the perimidine-based squarylium dye represented by Formula (I), its permeability, its ink viscosity and its freezing point and so on. The content of the organic solvent in the ink for inkjet printers may be from 1% by weight to 60% by weight.

When the image-forming material of the exemplary embodiment is an ink for inkjet printers, the image-forming material may contain additives so far known as ink constituents, so as to satisfy a variety of specifications that are required for the inkjet printer system. Examples of the additives include a pH adjuster, a specific resistance adjuster, an antioxidant, a preservative, a mildew-proofing agent and a metal sequestering agent. Examples of the pH adjuster include alcohol amines, ammonium salts and metal hydroxides. Examples of the specific resistance adjuster include organic salts and inorganic salts. Examples of the metal sequestering agent include chelating agents.

When the image-forming material of the exemplary embodiment is an ink for inkjet printers, the ink may include a water-soluble resin such as polyvinyl alcohol, polyvinyl pyrrolidone, carboxymethyl cellulose, a styrene-acrylic acid resin or a styrene-maleic acid resin in such an amount as not to cause clogging of a jet nozzle or deviation of an ink jetting direction, and so on.

When the image-forming material of the exemplary embodiment is an ink for typographic printing, offset printing, flexo printing, gravure printing or silk printing, the image-forming material may be an oil ink containing a polymer and/or an organic solvent. General examples of the polymer include natural resins such as proteins, rubbers, celluloses, shellac, copal, starch and rosin; thermoplastic resins such as vinyl resins, acrylic resins, styrene resins, polyolefin resins and novolak-type phenol resins; and thermosetting resins such as resol-type phenol resins, urea resins, melamine resins, polyurethane resins, epoxy resins and unsaturated polyesters. Examples of the organic solvent include those described above as examples of organic solvents usable in the ink for inkjet printers.

When the image-forming material of the exemplary embodiment is an ink for typographic printing, offset printing, flexographic printing, gravure printing or silk printing, the image-forming material may further contain an additive such as a plasticizer for improving the flexibility and/or strength of a printed film, a solvent for controlling the viscosity and/or improving the drying properties, a desiccant, a viscosity adjuster, a dispersant or various kinds of reactant.

The perimidine-based squarylium dye represented by Formula (I) is excellent in light resistance. Still, such an image-forming material may further contain a stabilizer so as to further improve the light resistance when used in the applications described above. The stabilizer should receive energy from the organic near-infrared absorbing dye in an excited state and preferably has an absorption band at the longer wavelength side of the absorption band of the near-infrared absorbing dye. In addition, it is preferable for the stabilizer to resist decomposition by singlet oxygen and to have high compatibility with the perimidine-based squarylium dye represented by Formula (I). Such a stabilizer may be, for example, an organic metal complex compound. Examples of the stabilizer include compounds represented by the following Formula (V).

In Formula (V), $R^1$ to $R^4$ may be the same as or different from each other, and each independently represent a substituted or unsubstituted phenyl group. When the phenyl group represented by any of $R^1$ to $R^4$ has a substituent, examples of the substituent include H, $NH_2$, OH, $N(C_hH_{2h+1})_2$, $OC_hH_{2h+1}$, $C_hH_{2h-1}$, $C_hH_{2h+1}$, $C_hH_{2h}OH$ or $C_hH_{2h}OH$ or $C_hH_{2h}OC_iH_{2i+1}$ (wherein h represents an integer from 1 to 18 and i represents an integer from 1 to 6). Further, $X^1$ to $X^4$ may be the same as or different from each other, and each represent O, S or Se, and Y represents a transition metal such as Ni, Co, Mn, Pd, Cu or Pt.

Among the compounds represented by Formula (V), a compound represented by the following Formula (VI) is preferred.

The concentration of the stabilizer may be from about 1/10 to about 2 times the weight of the perimidine-based squarylium dye represented by Formula (I).

The perimidine-based squarylium dye represented by Formula (I) has sufficiently low absorbance in a visible wavelength region of from 400 am to 750 nm and sufficiently high absorbance in a near-infrared wavelength region of from 750 nm to 1000 nm. Besides, such a perimidine-based squarylium dye is excellent in light resistance.

The image-forming material of the exemplary embodiment preferably satisfies the conditions represented by Formulas (II) and (III) shown below. When the conditions represented by Formulas (II) and (III) are satisfied, both invisibility of information and readability of the invisible information may be achieved, and, furthermore, the long term reliability of the recording medium in which the invisible information is recorded may be realized irrespective of the color hue of the image-forming material.

$$0 \leq \Delta E \leq 16 \quad (II)$$

$$(100-R) \geq 45 \quad (III)$$

In Formula (II), $\Delta E$ represents the color difference according to the CIE 1976 L*a*b* color system and is represented by Formula (IV) shown below:

$$\Delta E = \sqrt{(L_1-L_2)^2+(a_1-a_2)^2+(b_1-b_2)^2} \quad (IV)$$

In Formula (IV), $L_1$, $a_1$ and $b_1$ represent the values of "L", "a", and "b" of the recording medium surface before image formation; and $L_2$, $a_2$ and $b_2$ represent the values of "L", "a" and "b" of an image area when a fixed image formed by the image-forming material in an application amount of 4 g/m² is formed on the recording medium surface. In Formula (III), R (unit: %) represents infrared reflectance of the image area at a wavelength of 850 nm.

$L_1$, $a_1$, $b_1$, $L_2$, $a_2$ and $b_2$ can be obtained by using a reflection spectrodensitometer. $L_1$, $a_1$, $b_1$, $L_2$, $a_2$ and $b_2$ in the invention are measured with X-RITE 939 manufactured by X-Rite, Inc., as a reflection spectrodensitometer.

The invisible information recorded using the image-forming material of the exemplary embodiment may be read very easily at high sensitivity by using a semiconductor laser or light-emitting diode whose emission wavelength is within a wavelength range of, for example, from 750 nm to 1000 nm as a light source for optical reading and using a general-purpose light-receiving device having high spectral sensitivity to near-infrared light. The light-receiving device may be, for example, one in which silicon is used (such as CCD).

EXAMPLES

In what follows, the present invention will be described more specifically with reference to examples and comparative examples. However, the invention is not at all restricted to examples shown below.

Example 1

Preparation of Perimidine-Based Squarylium Dye

A mixed solution of 4.843 g of 1,8-diaminonaphthalene (98%, 30.0 mmol), 4.30 g of 3,3,5-trimethylcyclohexanone (98%, 30.0 mmol), 10 mg of p-toluenesulfonic acid monohydrate (0.053 mmol) and 45 ml of toluene is heated in a nitrogen gas atmosphere under agitation and refluxed for 5 hr. Water generated during the reaction is removed by azeotropic distillation. After the completion of the reaction, toluene is distilled off, and the obtained dark brownish solid is extracted with acetone, purified by recrystallization from a mixed solution of acetone and ethanol, and dried, whereby 7.60 g of brown solid (yield: 90.3%) is obtained. The results of an analysis of the obtained brown solid by ¹H-NMR spectrum (CDCl₃) are shown below.

¹H-NMR spectrum (CDCl₃): δ=7.25, 7.23, 7.21, 7.19, 7.15, 7.13, 7.12 (m, 4H, $H_{arom}$); 6.44 (dxd, $J_1$=18.0 Hz, $J_2$=7.0 Hz, 2H, $H_{arom}$); 4.52 (s, 1H, NH); 3.97 (s, 1H, NH); 2.11, 2.08, 2.04, 2.00 (m, 2H, CH₂); 1.89 (m, 1H, CH); 1.56, 1.52, 1.48 (m, 2H, CH₂); 1.09 (s, 3H, CH₃); 1.13, 1.04, 1.00, 0.97, 0.91, 0.85 (m, 2H, CH₂); 0.95 (d, J=6.0 Hz, 3H, CH₃); 0.88 (s, 3H, CH₃)

A mixed solution of 6.787 g of the obtained intermediate (24.2 mmol), 1.255 g of 3,4-dihydroxycyclobut-3-ene-1,2-dione (11.0 mmol), 55 ml of n-butanol and 85 ml of toluene is heated in a nitrogen gas atmosphere under agitation and refluxed for 3 hr. Water generated during the reaction is removed by azeotropic distillation. After the completion of the reaction, most of the solvent is distilled away under the nitrogen gas atmosphere, and 100 ml of hexane is added to the resultant reaction mixture with stirring. The resultant blue-black precipitate is collected by suction filtration, washed with hexane, and dried, whereby a blue-black solid is obtained. The solid is recrystallized from acetone/ethanol, thereby providing 4.40 g of a target compound (blue-black solid) (yield: 62.6%).

Figure 1:
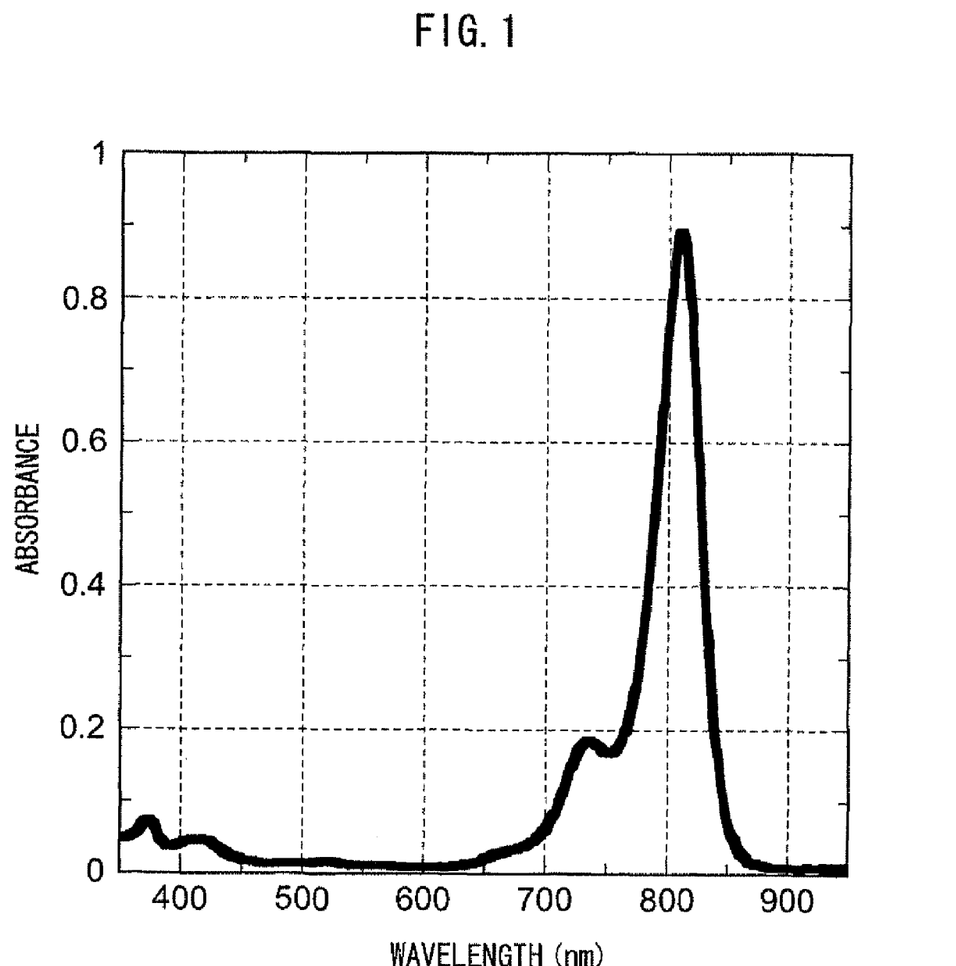
FIG. 1 is a graph showing a visible to near-infrared absorption spectrum of the perimidine-based squarylium dye represented by Formula (I-a) and obtained in Example 1.

The obtained dye compound is identified by spectrometry such as infrared absorption spectrum (KBr tablet method), ¹H-NMR (DMSO-d₆), FD-MS, element analyses and visible to near-infrared absorption spectrum. Identification data are shown below. The visible to near-infrared absorption spectrum is shown in FIG. 1. As the result of the identification, it is confirmed that the obtained compound is the perimidine-based squarylium dye represented by Formula (I-a).

Infrared absorption spectrum (KBr tablet method):
$v_{max}$=3437, 3371, 3294 (NH); 3051 (=C—H), 2951 ($CH_3$), 2916 ($CH_2$), 2868, 2837 ($CH_3$), 1620, 1599, 1570, 1550 (C=C ring), 1452, 1425, 1367 ($CH_3$, $CH_2$), 1315, 1288, 1232, 1225, 1201 (C—N), 1188, 1163, 1136, 1111 (C—O$^-$), 1057, 1018, 939, 918, 877, 820, 783, 756, 715 $cm^{-1}$ 1H-NMR spectrum (DMSO-$d_6$):
δ=10.28 (s, 1H, NH); 9.48 (s, 1H, NH); 8.02 (s, 1H, NH); 7.85 (brs, 1H, NH); 7.34 (t, J=7.81 Hz, 2H, $H_{arom}$); 7.08 (s, 2H, $H_{arom}$); 6.83 (s, 2H, $H_{arom}$); 6.81 (d, J=1.46 Hz, 2H, $H_{arom}$); 6.52 (d, J=7.32 Hz, 2H, $H_{arom}$); 2.22, 2.19, 2.18 (m, 2H, $CH_2$); 2.08 (m, 2H, $CH_2$); 1.76 (m, 2H, CH); 1.52, 1.49 (m, 2H, $CH_2$); 1.42-1.31 (m, 2H, $CH_2$); 1.25 (m, 4H, $CH_2$); 1.10, 1.07, 1.05, 1.03 (m, 6H, 2×$CH_3$); 0.94 (m, 6H, 2×$CH_3$); 0.88, 0.86, 0.84, 0.82 (m, 6H, 2×$CH_3$)

Mass spectrum (FD):
m/z=638 ($M^+$, 100%), 639 ($M^+$+1, 46.7%)
Element analysis:
C: 78.5% (measured value), 78.96% (calculated value)
H: 7.11% (measured value), 7.26% (calculated value)
N: 8.76% (measured value), 8.77% (calculated value)
O: 5.63% (measured value), 5.01% (calculated value)
Visible to near-infrared absorption spectrum (FIG. 1):
$\lambda_{max}$=812 nm (in tetrahydrofuran solution)
$\epsilon_{max}$=1.80×$10^5$ $M^{-1}$ $cm^{-1}$ (in tetrahydrofiran solution)

Example 2

Pigment-Forming Treatment and Colorimetric Evaluation

Pigment-forming treatment and calorimetric evaluation of the perimidine-based squarylium dye obtained in Example 1 are carried out as described below.

Figure 2:
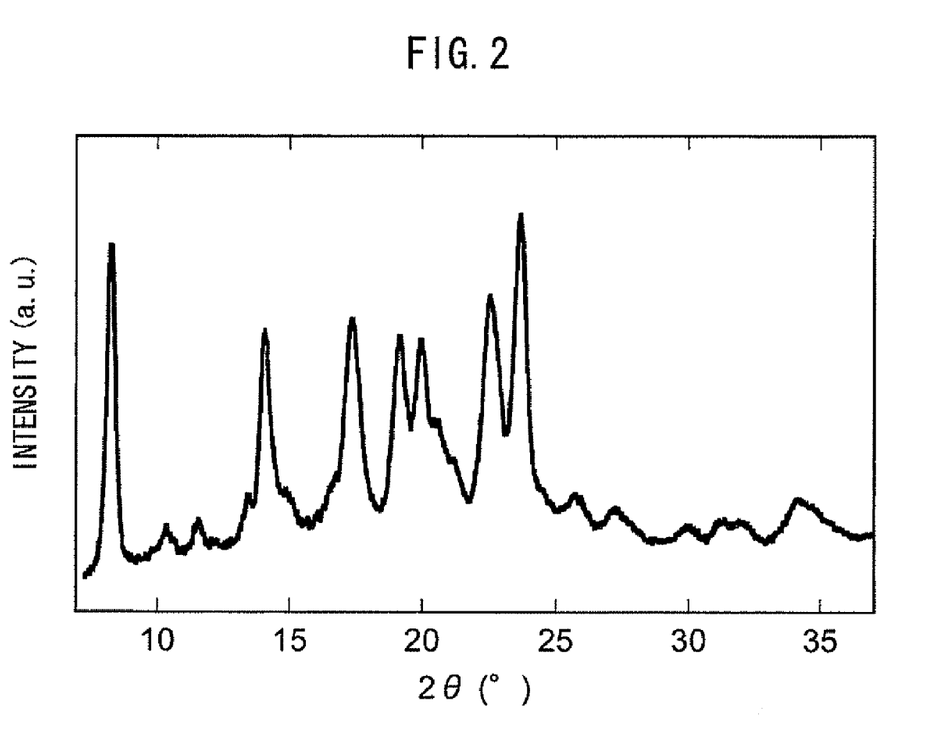
FIG. 2 is a graph showing a powder X-ray diffraction spectrum of ISQ-15.

Microparticulation
50 mg of the perimidine-based squarylium dye obtained in Example 1, 0.5 mL of hexane and 10 g of zirconia beads having a diameter of 1 mm are charged in a vessel for ball milling, and subjected to milling at a rotation speed of 600 rpm for 1 hr. Then, water is added into the vessel for ball milling, and the solution is filtered through a 50-nm filter, and a microparticulated perimidine-based squarylium dye (hereinafter, referred to as "ISQ-15") is recovered. The particle diameter of ISQ-15 is about 105 nm in terms of median diameter d50. ISQ-15 is subjected to X-ray diffraction measurement using a Cu target and an X-ray diffractometer (trade name: D8 DISCOVER, manufactured by Bruker AXS K.K.), and irradiation with X-ray having λ=1.5405 Å is performed. The obtained powder X-ray diffraction spectrum is shown in FIG. 2. In the powder X-ray diffraction spectrum, ISQ-15 has diffraction peaks at least at 8.3°, 14.1°, 17.4°, 19.2°, 20.0°, 22.6° and 23.7° in terms of Bragg angle (2θ±0.2°). From the measurement results of the powder X-ray diffraction, it is found that ISQ-15 has high crystallinity.

Preparation of Slurry
9.2 mg of ISQ-15, 46 μL of 12% triton X-100 aqueous solution and 5.52 ml of distilled water are mixed and subjected to ultrasonic dispersion treatment for 30 minutes using ¼ inch horn at an ultrasonic output of from 4 to 5 W, whereby a slurry is prepared. The sample concentration in the slurry is 0.165% by weight.

Preparation of Slurry-Coated Paper and Color Characteristics Evaluation

Figure 3:
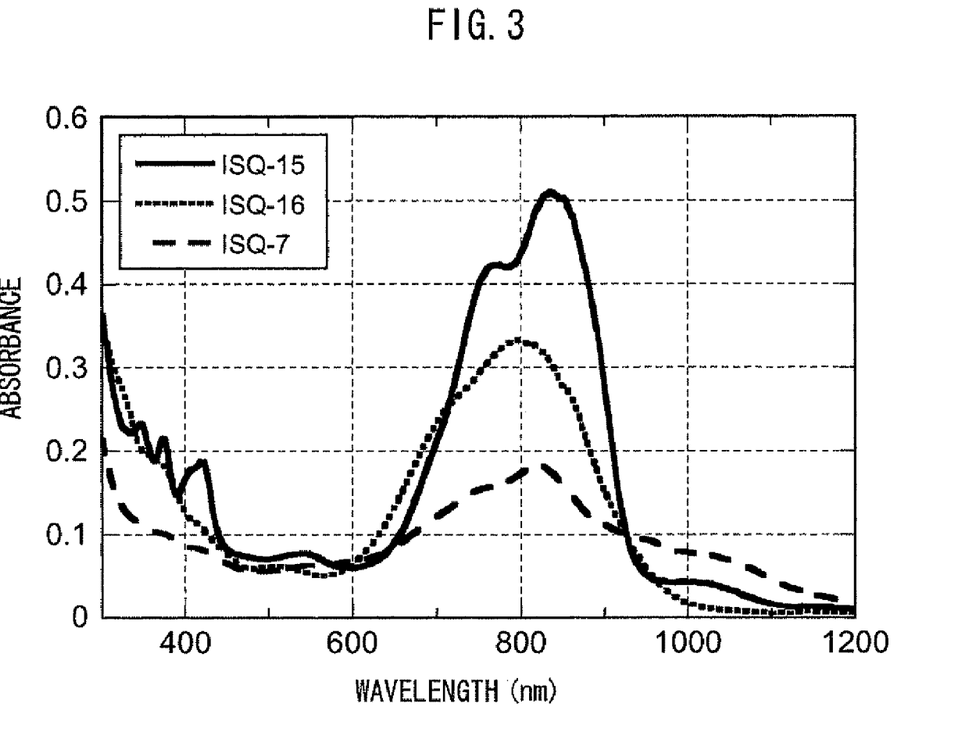
FIG. 3 is a graph showing absorption spectra of latex patches obtained using ISQ-15, ISQ-16 and ISQ-7.

A mixed solution of 40.4 μL of the ISQ-15 slurry (sample concentration: 0.165% by weight), 15 μL of 40% by weight latex (copolymer of styrene and n-butyl acrylate) solution and 5 g of distilled water is dispersed using Ultra-Turrax, to provide a mixed slurry. Into the obtained mixed slurry, a PAC flocculant is added, thus a pseudo toner dispersion liquid is prepared. The dispersion liquid is filtered through a sheet of 220-nm filter paper, and the resulting lamination layer on the paper is air-dried, and then subjected to thermocompression bonding (120° C.; mode 1), whereby a latex patch for evaluation is prepared. The TMA (toner mass per unit area) of the patch is 4.5 g/$m^2$ and the PMA (pigment mass per unit area) of the patch is 0.045 g/$m^2$ (corresponding to 1% by weight). The coated paper thus made is used as a sample, and measured with a spectrophotometer U-4100 (trade name, manufactured by Hitachi Ltd.). The absorption spectrum of the latex patch is shown in FIG. 3.

The pigment prepared using ISQ-15 is subjected to measurement with a reflection spectrodensitometer (trade name: X-RITE 939, manufactured by X-rite, Inc.), and ΔE in Formula (II) and R in Formula (III) are obtained. The evaluation results of the coated paper sample are shown in Table 1.

Figure 4:
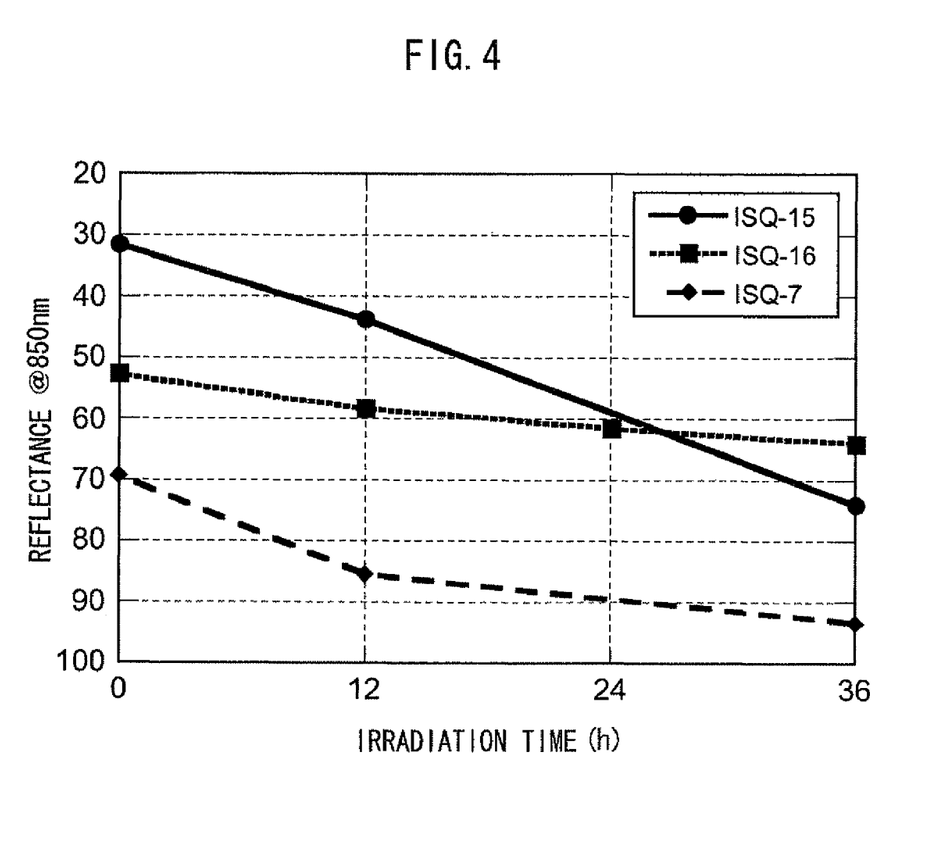
FIG. 4 is a graph showing a relationship between reflectance and photo-irradiation time of each of coated paper samples obtained using ISQ-15, ISQ-16 and ISQ-7.

Light Resistance Test
Light irradiation is performed on the coated paper sample for 36 hrs at an irradiance of 540 W/$m^2$ (=100 k 1x) using a xenon lamp as a light source without a UV-cut filter. During the irradiation, the peak absorbance is measured with a spectrophotometer U-4100 (trade name, manufactured by Hitachi Ltd.). In FIG. 4, the relationship between the reflectance of the coated paper sample and the irradiation time is shown.

In Table 1, the evaluation criteria of the "readability" and "invisibility" are as follows (the same applies hereinafter).
(Readability)
A: Initial reflectance at 850 nm, R (%)≦35
B: 35<Initial reflectance at 850 nm, R (%)≦55
C: Initial reflectance at 850 nm, R (%)>55
(Invisibility)

A: 0≦ΔE≦5

B: 5≦ΔE≦16

C: ΔE>16

Example 3

Preparation of Perimidine-Based Squarylium Dye

A mixed solution of 4.843 g of 1,8-diaminonaphthalene (98%, 30.0 mmol), 4.722 g of 3,3,5,5-tetramethylcyclohexanone (98%, 30.0 mmol), 44 mg of p-toluenesulfonic acid monohydrate (0.23 mmol) and 45 ml of toluene is heated in a nitrogen gas atmosphere under agitation and refluxed for 7 hr. Water generated during the reaction is removed by azeotibpic distillation. After the completion of the reaction, toluene is distilled away, whereby a dark brownish solid is obtained. The dark brownish solid is extracted with acetone, purified by recrystallization from a mixed solvent of acetone and ethanol, and dried, thereby providing 8.10 g of brown solid (yield: 91.7%). The results of an analysis of the obtained brown solid by $^1$H-NMR spectrum (CDCl$_3$) are shown below.

$^1$H-NMR spectrum (CDCl$_3$): δ=7.25; 7.23, 7.21, 7.18, 7.16 (m, 4H, $H_{arom}$); 6.48 (d×d, $J_1$=12.0 Hz, $J_2$=6.0 Hz, 2H, $H_{arom}$); 4.19 (br s, 2H, NH); 1.61 (s, 4H, 2×$CH_2$); 1.33 (s, 2H, $CH_2$); 1.08 (s, 12H, 4×$CH_3$)

A mixed solution of 7.36 g of the intermediate (25.0 mmol), 1.369 g of 3,4-dihydroxycyclobut-3-ene-1,2-dione (12.0 mmol), 60 ml of n-butanol and 90 ml of toluene is heated in a nitrogen gas atmosphere under agitation and refluxed for 3 hr. Water generated during the reaction is removed by azeotropic distillation. After the completion of the reaction, most of the solvent is distilled away under the nitrogen gas atmosphere, and 100 ml of hexane is added to the resultant reaction mixture with stirring. The resultant yellowish brown precipitate is collected by suction filtration, washed with hexane and ethanol, and dried, thereby providing 5.80 g (yield: 72.5%) of a yellowish brown solid, which is the target compound.

Figure 5:
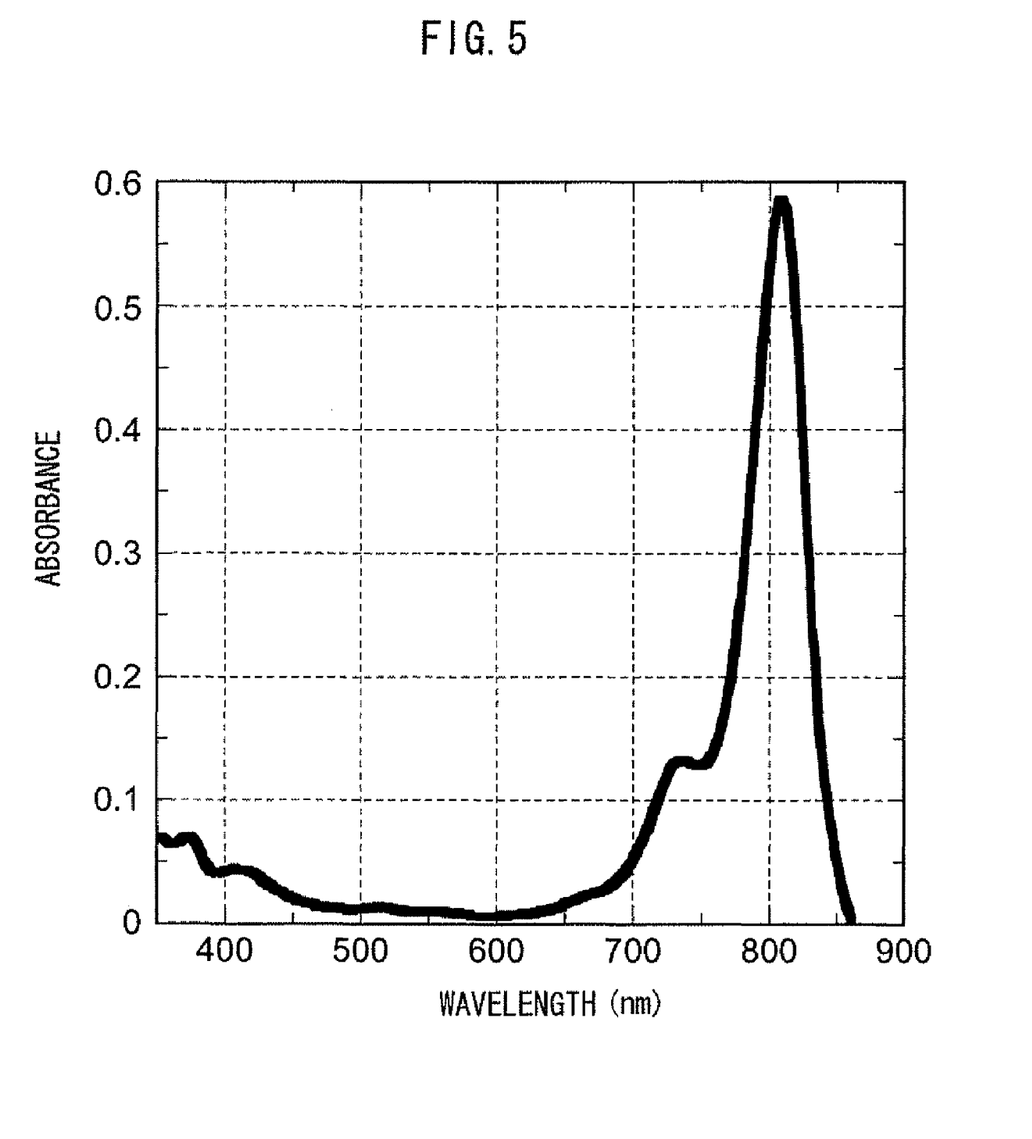
FIG. 5 is a graph showing a visible to near-infrared absorption spectrum of the perimidine-based squarylium dye represented by Formula (I-b) and obtained in Example 3.

The resultant dye compound is identified by spectrometry such as infrared absorption spectrum (KBr tablet method), $^1$H-NMR (DMSO-$d_6$), FD-MS, element analyses and visible to near-infrared absorption spectrum. The identification data are shown below. The visible to near-infrared absorption spectrum is shown in FIG. 5. As the result of the identification, it is confirmed that the obtained compound is the perimidine-based squarylium dye represented by Formula (I-b).

Infrared absorption spectrum (KBr tablet method):
$\mu_{max}$=3467, 3437, 3275 (NH), 3057 (=C—H), 2952 ($CH_3$), 2904 ($CH_2$), 2865, 2835 ($CH_3$), 1616, 1599, 1570, 1508 (C=C ring), 1458, 1425, 1383, 1354 ($CH_3$, $CH_2$), 1308, 1228, 1200 (C—N), 1186, 1165, 1138 (C—O$^-$), 1061, 1032, 1011, 924, 881, 843, 816, 752, 723 cm$^{-1}$ $^1$H-NMR spectrum (DMSO-$d_6$): δ=10.30 (m, 2H, NH); 7.85 (m, 2H, NH); 7.38 (t, J=7.8 Hz, 2H, $H_{arom}$); 7.12 (s, 2H, $H_{arom}$); 6.85 (s, 2H, $H_{arom}$); 6.83 (d, J=1.46 Hz, 2H, $H_{arom}$); 6.56 (d, J=7.32 Hz, 2H, $H_{arom}$); 1.61 (s, 8H, 4×$CH_2$); 1.33 (s, 4H, 2×$CH_2$); 1.08 (s, 24H, 8×$CH_3$)

Mass spectrum (FD):
m/z=666 (M$^+$, 100%), 667 (M$^+$+1, 62.7%)
Element analysis:
C: 77.9% (measured value), 79.24% (calculated value)
H: 7.23% (measured value), 7.56% (calculated value)
N: 8.36% (measured value), 8.40% (calculated value)
O: 6.51% (measured value), 4.80% (calculated value)
Visible to near-infrared absorption spectrum (FIG. 5):
$\lambda_{max}$=811 nm (in tetrahydrofuran solution)
$\epsilon_{max}$=1.07×10$^5$ M$^{-1}$ cm$^{-1}$ (in tetrahydrofuran solution)

Example 4

Pigment-Forming Treatment and Colorimetric Evaluation

Pigment-forming treatment of the perimidine-based squarylium dye obtained in Example 3 is carried out according to a method shown below.

Figure 6:
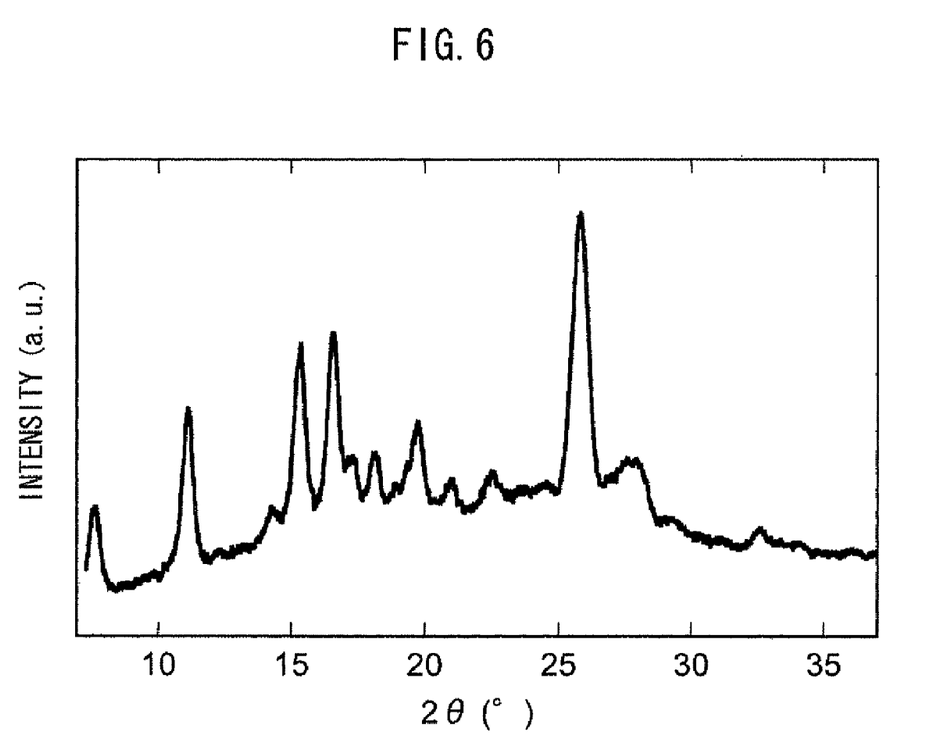
FIG. 6 is a graph showing a powder X-ray diffraction spectrum of ISQ-16.

Microparticulation 50 mg of the perimidine-based squarylium dye obtained in Example 3, 0.5 mL of hexane and 10 g of zirconia beads having a diameter of 1 mm are charged in a vessel for ball milling, and subjected to milling at a rotation speed of 600 rpm for 1 hr. Then, water is added into the vessel for ball milling, and the solution is filtered through a 50-nm filter, and a microparticulated perimidine-based squarylium dye (hereinafter, referred to as "ISQ-16") is recovered. The particle diameter of ISQ-16 is about 85 nm in terms of median diameter d50. ISQ-16 is subjected to X-ray diffraction measurement using a Cu target and an X-ray diffractometer (trade name: D8 DISCOVER, manufactured by Bruller AXS K. K.), and irradiation with X-ray having λ=1.5405 Å is performed. The obtained powder X-ray diffraction spectrum is shown in FIG. 6. In the powder X-ray diffraction spectrum, ISQ-16 has diffraction peaks at least at 7.7°, 11.2°, 15.4°, 16.6°, 18.2°, 19.8° and 25.8° in terms of Bragg angle (2θ±0.2°). From the measurement results of the powder X-ray diffraction, it is found that ISQ-16 has high crystallinity.

Using ISQ-16, slurry preparation, preparation of slurry-coated paper, colorimetric evaluation and light resistance test, are performed in a manner similar to that adopted in Example 2. The obtained results are shown in FIGS. 3 and 4 and Table 1.

Comparative Example 1

A dye compound represented by the following Formula (VII) is microparticulated according to the method described below.

(VII)

Figure 7:
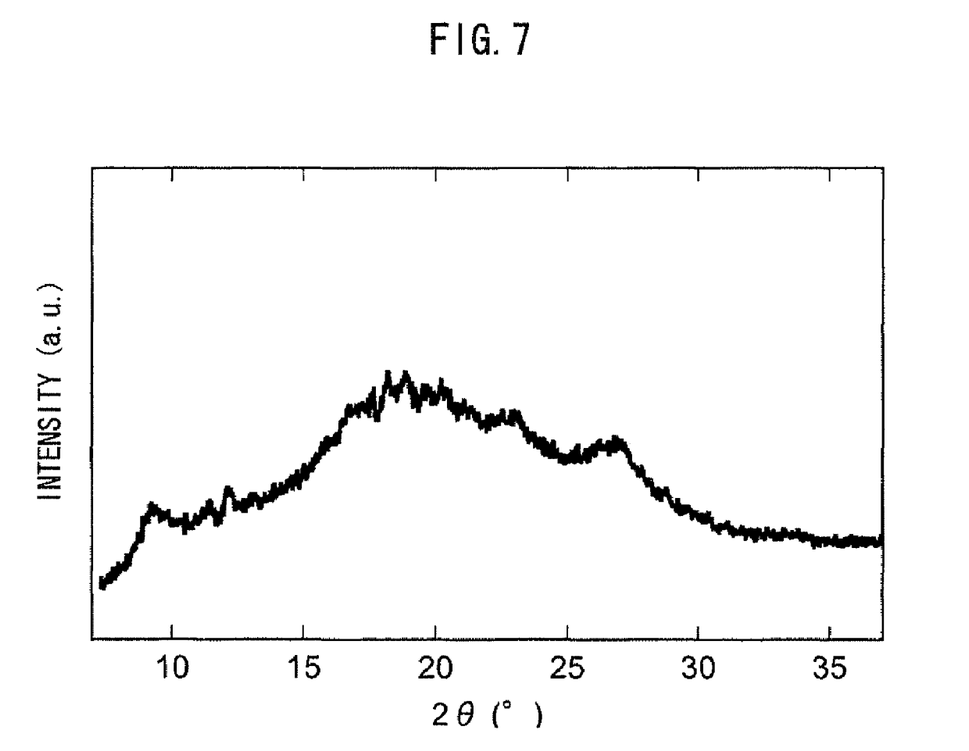
FIG. 7 is a graph showing a powder X-ray diffraction spectrum of ISQ-7.

Reprecipitation Method 40 mg of the dye compound represented by Formula (VII) is dissolved in 30 mL of tetrahydrofuran (THF) and the solution is charged at once into 2000 mL of ice-cooled distilled water using a micro-syringe, to perform reprecipitation. After a few minutes, the mixed solution is returned to room temperature, and the precipitates are collected by filtration through a 50-nm filter The collected precipitates are washed with distilled water and dried in vacuum, whereby a reprecipitated dye compound (hereinafter, referred to as "ISQ-7") is recovered. The particle diameter of ISQ-7 is about 190 nm in terms of median diameter d50. The powder X-ray diffraction spectrum of ISQ-7 is measured in a manner similar to that adopted in Example 2, by irradiation of X-ray with a wavelength of λ=1.5405 Å using a Cu target, and is shown in FIG. 7. In the powder X-ray diffraction spectrum, diffraction peaks derived from crystals are hardly observed, indicating that ISQ-7 obtained by the reprecipitation method is non-crystalline.

ISQ-7 of Comparative Example 1 is subjected to calorimetric evaluation and a light resistance test in a manner similar to that adopted in Example 2. The obtained results are shown in FIGS. 3 and 4 and Table 1.

Comparative Example 2

A conventional vanadylnaphthalocyanine dye (hereinafter, referred to as "VONPc"), is subjected to calorimetric evaluation in a manner similar to that adopted in Example 2. The obtained results are shown in Table 1.

TABLE 1

| | Sample | Initial Reflectance at 850 nm R (%) | ΔE | Readability | Invisibility |
|---|---|---|---|---|---|
| Example 2 | ISQ-15 (median diameter d50: 105 nm φ) | 31.43 | 4.2 | A | A |
| Example 4 | ISQ-16 (median diameter d50: 85 nm φ) | 52.70 | 5.3 | B | B |
| Comparative Example 1 | ISQ-7 (median diameter d50: 190 nm φ, non-crystalline) | 69.32 | 6.3 | C | B |
| Comparative Example 2 | VONPc | 24.76 | 32.4 | A | C |

As is clear from the table, it is found that both the readability and invisibility are achieved at higher levels in the case of ISQ-15 of Example 2 and ISQ-16 of Example 4, than in the case of ISQ-7 of Comparative Example 1 and VONPc of Comparative Example 2. In particular, ISQ-15 of Example 2 and ISQ-16 of Example 4 are largely improved in the infrared absorbing properties and light resistance while the invisibility is maintained, compared to ISQ-7 of Comparative Example 1.

What is claimed is:

1. An image-forming material, comprising a perimidine-based squarylium dye represented by the following Formula (I):

(I)

wherein, in Formula (I), R represents a hydrogen atom or a methyl group.

2. The image-forming material according to claim 1, wherein the perimidine-based squarylium dye is a compound represented by Formula (I-a) and has diffraction peaks at least at 8.3°, 14.1°, 17.4°, 19.2°, 20.0°, 22.6° and 23.7° in terms of Bragg angle (2θ±0.2°) in a powder X-ray diffraction spectrum measured by irradiation with X-ray having a wavelength of 1.5405 Å using a Cu target, and is in a form of crystalline particles:

(I-a)

3. The image-forming material of claim 1, wherein the perimidine-based squarylium dye is a compound represented by Formula (I-b) and has diffraction peaks at least at 7.7°, 11.2°, 15.4°, 16.6°, 18.2°, 19.8° and 25.8° in terms of Bragg angle (2θ±0.2°) in a powder X-ray diffraction spectrum measured by irradiation with X-ray having a wavelength of 1.5405 Å using a Cu target and is in a form of crystalline particles:

(I-b)

4. The image-forming material according to claim 1, wherein the perimidine-based squarylium dye is in a form of crystalline particles having a median diameter, d50, of from about 10 nm to about 300 nm.

5. The image-forming material according to claim 1, wherein the content of the perimidine-based squarylium dye is from about 0.05% by weight to about 3% by weight of the total weight of the image-forming material.

6. The image-forming material according to claim 1, wherein the image-forming material is an electrophotographic toner.

7. The image-forming material according to claim 1, wherein the image-forming material is an ink for inkjet printers.

8. The image-forming material according to claim 1, further comprising a compound represented by the following Formula (V);

(V)

wherein, in Formula (V), $R^1$ to $R^4$ may be the same as or different from each other, and each independently represent a substituted or unsubstituted phenyl group; $X_1$ to $X_4$ may be the same as or different from each other, and each independently represent O, S, or Se; and Y represents a transition metal.

9. The image-forming material according to claim 1, wherein the image-forming material satisfies conditions represented by the following Formulas (II) and (III):

$$0 \leq \Delta E \leq 16 \quad (II)$$

$$(100-R) \geq 45 \quad (III)$$

wherein, in Formula (II), $\Delta E$ represents a color difference according to the CIE 1976 L*a*b* color system and is represented by Formula (IV) shown below:

$$\Delta E = \sqrt{(L_1-L_2)^2+(a_1-a2)^2+(b_1-b_2)^2} \quad (IV)$$

wherein, in Formula (IV), $L_1$, $a_1$ and $b_1$ represent values of "L", "a", and "b" of a surface of a recording medium before image formation; and $L_2$, $a_2$ and $b_2$ represent values of "L", "a" and "b" of an image area when a fixed image formed by the image-forming material with an application amount of 4 g/m² is formed on the surface of the recording medium; and wherein, in Formula (III), R (unit: %) represents infrared reflectance of the image area at a wavelength of 850 nm.

* * * * *